United States Patent
de Lima et al.

(10) Patent No.: US 10,892,959 B2
(45) Date of Patent: Jan. 12, 2021

(54) PRIORITIZATION OF INFORMATION TECHNOLOGY INFRASTRUCTURE INCIDENTS

(71) Applicant: INTERNATIONAL BUSINESS MACHINES CORPORATION, Armonk, NY (US)

(72) Inventors: Bruno Fonseca de Lima, Belo Horizonte (BR); John R. Dudley, Research Triangle Park, NC (US); Paolo Ciravegna, Turin (IT)

(73) Assignee: International Business Machines Corporation, Armonk, NY (US)

(*) Notice: Subject to any disclaimer, the term of this patent is extended or adjusted under 35 U.S.C. 154(b) by 55 days.

(21) Appl. No.: 16/032,833

(22) Filed: Jul. 11, 2018

(65) Prior Publication Data
US 2020/0021503 A1 Jan. 16, 2020

(51) Int. Cl.
*H04L 12/24* (2006.01)
*G06Q 10/06* (2012.01)
*G06F 9/50* (2006.01)
*G06F 16/38* (2019.01)

(52) U.S. Cl.
CPC ........ *H04L 41/5022* (2013.01); *G06F 9/5038* (2013.01); *G06F 16/38* (2019.01); *G06Q 10/06393* (2013.01); *H04L 41/06* (2013.01)

(58) Field of Classification Search
CPC ..... H04L 41/5022; H04L 41/06; G06F 16/38; G06F 9/5038; G06Q 10/06393
See application file for complete search history.

(56) References Cited

U.S. PATENT DOCUMENTS

| 7,774,458 B2 | 8/2010 | Trinon et al. |
| 8,161,326 B2 | 4/2012 | Dixit et al. |
| 8,285,578 B2 | 10/2012 | Sheppard |
| 8,645,276 B2 | 2/2014 | Wong et al. |
| 9,807,116 B2* | 10/2017 | Frascadore ............ H04L 63/20 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Moustafa M Meky
*Assistant Examiner* — Kidest Mendaye
(74) *Attorney, Agent, or Firm* — Heslin Rothenberg Farley & Mesiti P.C.; Michael A. Petrocelli

(57) ABSTRACT

A method, computer program product, and a system where a processor(s) obtains notifications of issues experienced in computing resources allocated to an entity from a shared distributed computing environment and notifications of events with discernable impacts on business performance measures of the entity. The processor(s) quantifies a technical performance impact of each issue and a business performance impact of each event. The processor(s) cognitively analyzes the business performance impact of each event and the technical performance impact of each issue to correlate a portion of the quantified events with a portion of the quantified issues. The processor(s) prioritizes, the portion of the issues by severity of business performance impact. The processor(s) mitigates the portion of the issues experienced in the computing resources allocated to the entity, in order of priority.

18 Claims, 11 Drawing Sheets

(56) References Cited

U.S. PATENT DOCUMENTS

| | | | |
|---|---|---|---|
| 2009/0138340 A1* | 5/2009 | Borr | G06Q 10/06 |
| | | | 705/7.39 |
| 2016/0269312 A1* | 9/2016 | Cavalcante | G06Q 10/0631 |
| 2016/0373313 A1 | 12/2016 | Giri et al. | |
| 2017/0054605 A1* | 2/2017 | Duncan | H04L 41/0686 |
| 2017/0124501 A1 | 5/2017 | Crabtree et al. | |
| 2018/0309636 A1* | 10/2018 | Strom | H04L 41/12 |
| 2019/0073615 A1* | 3/2019 | Ronen | A61B 5/0004 |

* cited by examiner

PRIORITIZATION OF INFORMATION TECHNOLOGY INFRASTRUCTURE INCIDENTS

BACKGROUND

As computing systems become more complex, and the resources utilized by a given user become less centralized, issues can occur within computing systems that affect efficiency, but are difficult both to diagnose as well as to resolve. Given the complexity of these distributed systems, including cloud computing systems, prioritizing, for mitigation, issues perceived through monitoring of the resources of the system, can be problematic. Many existing monitoring systems offer no prioritization and merely trigger actions to mitigate issues when these issues are identified. These systems lack a dynamic prioritization system able to align, automatically, incidents priorities with established criteria, including but not limited to, business needs (i.e., needs that impact the efficiency and/or continuity of a business utilizing the resources and are determinative of the efficacy of the system for the business). The users who are familiar with the business needs of an organization are rarely familiar with the impacts and potential impacts of the computing resources utilized by the business to meet these needs, ultimately. Thus, individuals familiar with the business needs have no visibility to issues developing in an information technology infrastructure that are relevant to these needs. Additionally, certain business needs, rather than being actively dictated by an organization's management, are impacted by diverse channels, including but not limited to, emails, social media postages, newspapers and/or government announcements. Computing resource monitoring approaches do not contextualize these channels when reporting, prioritizing, and resolving issues with the computing resources, in an environment utilized by an organization.

SUMMARY

Shortcomings of the prior art are overcome and additional advantages are provided through the provision of a method for prioritizing mitigation of technical issues in allocated resources. The method includes, for instance: obtaining, by one or more processors, notifications of issues experienced in computing resources allocated to an entity from a shared distributed computing environment; obtaining, by the one or more processors, notifications of events with discernable impacts on business performance measures of the entity; quantifying, by the one or more processors, a technical performance impact of each issue of the issues on the technical performance of the allocated computing resources; quantifying, by the one or more processors, based on one or more performance measures, a business performance impact of each event of the events on the business performance measures of the entity; cognitively analyzing, by the one or more processors, the business performance impact of each event and the technical performance impact of each issue to correlate a portion of the quantified events with a portion of the quantified issues; prioritizing, by the one or more processors, based on the cognitive analysis, the portion of the issues by severity of business performance impact, wherein an issue of the portion with a greater discernable impact on business performance is assigned a higher priority; and mitigating, by the one or more processors, the portion of the issues experienced in the computing resources allocated to the entity, in order of priority.

Shortcomings of the prior art are overcome and additional advantages are provided through the provision of a computer program product for prioritizing mitigation of technical issues in allocated resources. The computer program product comprises a storage medium readable by a processing circuit and storing instructions for execution by the processing circuit for performing a method. The method includes, for instance: obtaining, by the one or more processors, notifications of issues experienced in computing resources allocated to an entity from a shared distributed computing environment; obtaining, by the one or more processors, notifications of events with discernable impacts on business performance measures of the entity; quantifying, by the one or more processors, a technical performance impact of each issue of the issues on the technical performance of the allocated computing resources; quantifying, by the one or more processors, based on one or more performance measures, a business performance impact of each event of the events on the business performance measures of the entity; cognitively analyzing, by the one or more processors, the business performance impact of each event and the technical performance impact of each issue to correlate a portion of the quantified events with a portion of the quantified issues; prioritizing, by the one or more processors, based on the cognitive analysis, the portion of the issues by severity of business performance impact, wherein an issue of the portion with a greater discernable impact on business performance is assigned a higher priority; and mitigating, by the one or more processors, the portion of the issues experienced in the computing resources allocated to the entity, in order of priority.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
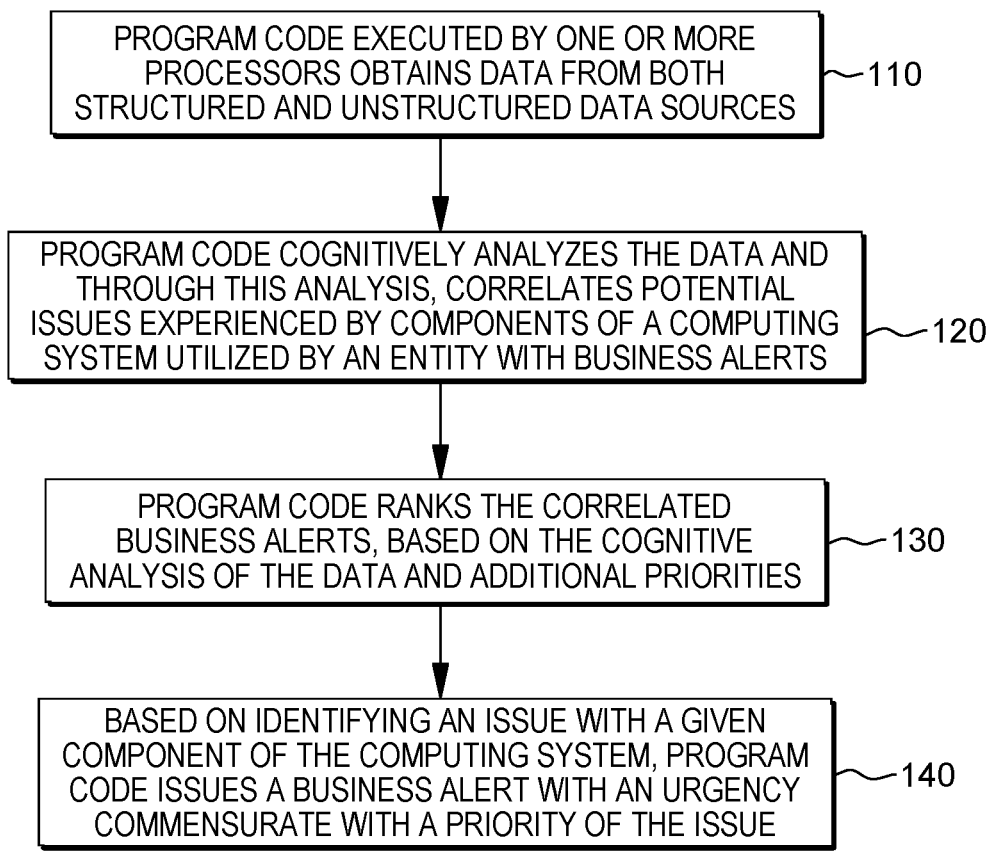
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 9:
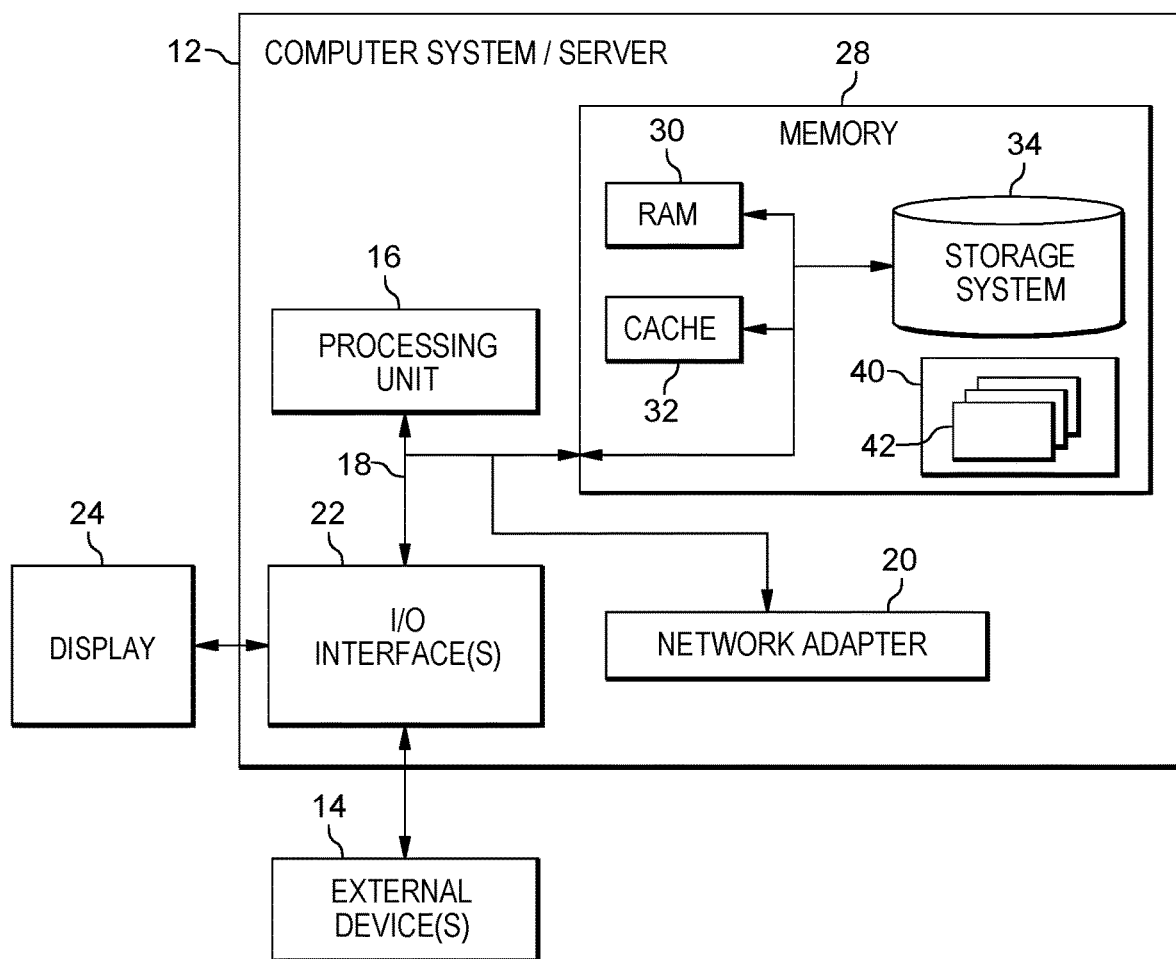
FIG. 9 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 9 as program/utility 40, having a set (at least one) of program modules 42, can be stored in memory 28.

Embodiments of the present invention include a computer-implemented method, a computer program product, and a computer system that include program code executed on at least one processing circuit that mitigates potential impacts experienced by a user of one or more resources in a technical environment by: 1) prioritizing technical incidents experienced within the environment in accordance with potential impacts of the incidents based on performance indicators; 2) establishing reliable performance indicators (upon which to base the prioritizing) by identifying and performing cognitive analyses on contextual data from internal and external communication channels; and 3) dynamically prioritizing incident mitigation based on defined priorities (e.g., priorities defined by the users or group of users utilizing the resource of the technical environment). Embodiments of the present invention utilize a diverse group of unstructured and structured data in order to create transparency between operational (e.g., business) goals and milestones of a user base and the computing systems that are integral to achieving those goals, enabling the resources of the computing system to function in a manner that comports with meeting these goals and milestones. Aspects of some embodiments of the present invention represent a cognitive solution where the program code connects business with information technology (IT) infrastructure to by providing a business-responsive IT monitor that protects business processes. The program code, through a cognitive analysis (which can include utilizing a cognitive agent) machine learns a relationship between business performance conditions and the status of IT elements. Based on defining this relationship, the program code prioritizes responses to issues that negatively impact the status of the elements, to avoid or mitigate these impacts.

Some embodiments of the present invention provide program code that fills the gaps between monitoring an IT infrastructure and providing a business-responsive IT infrastructure. As such, aspects of some embodiments of the present invention provide advantages over existing approaches to monitoring and mitigating issues in distributed computing systems. For example, some monitoring and mitigation systems prioritize incidents based on the prevalence of that incident within a given time period, assigning the incidents that occur more frequently to higher priority queues in order to be addressed and corrected more quickly. The frequency of a given incident is often not relevant to the impact of the incident (or the type of incident) on the business. For example, while a first, repeating, issue with a given resource has minimal impacts on the productivity of the users, a second issue, which occurs only once, with another resource, can severely impact the efficiency of the users and even hinder the efficacy of the computing system as a whole, from the perspectives of the users. Rather than rely on frequency of incidents in prioritizing which issues to mitigate, in embodiments of the present invention, the program code, executed by at least one processing resource, utilizes performance indicators tied to the efficacy of the system when experiencing the incidents, from a user perspective, when prioritizing the issues that are the cause of the incidents that are to be mitigated, and scheduling these issues for mitigation. As another example of an advantage of aspects of the present invention, some existing monitoring and mitigation systems prioritize which issues (identified through system monitoring) to address based on the importance of the customer experiencing each issue. In these system, customers submit reports and the program code determines the order for issue mitigation based on the priority ranking of the customer. Rather than attribute a single status to all issues experienced by a given entity, in embodiments of the present invention, the program code prioritizes issue mitigation based on performance indicators that are linked to the specific processes that are impacted by the issues and the priorities of these processes to the customers (e.g., users). Thus, in embodiments of the present invention, the program code provides a more granular and contextual approach to prioritizing mitigation of issues experienced in a distributed computing environment.

Advantages of aspects of embodiments of the present invention to productivity are not experienced only by the users of the resources. Rather, individuals and systems tasked with addressing issues are also more effective and productive based on aspects of embodiments of the present invention. The program code can determine that a given incident is of a higher priority, based on perceived potential business impacts, and based on this determination, resources to mitigate issues can be focused on this identifier higher priority incident. Based on performing a cognitive analysis, in embodiments of the present invention, the program code can provide, to processes and individuals responsible for issue mitigation, a percentage risk of business impact index related to each element in a given technical environment.

As noted above, embodiments of the present invention provide significantly more than existing systems monitoring and issues mitigation systems, however, embodiments of the present invention are additionally inextricably tied to computing. For example, embodiments of the present invention are inextricably tied to computing at least because the program code in these embodiments utilizes the digital communication channels and the real-time communications, enabled in a distributed computing environment, and performs a cognitive analysis (accessing resources available based on the connectivity of the computing system) to facilitate the generation of key performance factors to generate an optimal order for mitigating issues identified within the system, to ensure efficiency and efficacy within the computing system. Additionally, the utilization of applications as a service, via a shared computing environment (e.g., a cloud computing system), is a challenge unique to computing and is addressed with an approach that utilizes features of computing resources to guard the capacity, efficiency, performance, and efficacy, of a computing system. Absent aspects in embodiments of the present invention, the performance of the computing system would be compromised. As will be explained herein in greater detail, in embodiments of the present invention, the diversity of the data and the ability of the program code to synthesize a variety of data enables the program code to factor information into the (cognitive) analysis, including temporal data, which is synthesized, in real-time, in order to realize the impacts of the issues on users' utilization of the computing system to meet defined goals. The prioritization is enabled by this computing-dependent functionality.

Aspects of various embodiments of the present invention can be implemented across a diverse number of systems and technical resources and can coordinate with various technical environment resources. Embodiments of the present invention are platform independent and can be integrated with service management solution that runs business process management (BPM) and/or information technology service management (ITSM). Additionally, aspects of embodiments of the present invention can be implemented as a system component, and/or a software as a service solution. Embodiments of the present invention can be utilized in shared computing environments, including cloud computing systems. Some of these shared processing environments can utilize a cloud management platform that automates provisioning of cloud services using policy-based tools, including but not limited to, IBM® Cloud Orchestrator. IBM® is a registered trademark of International Business Machines Corporation, Armonk, N.Y., US. Program code in embodiments of the present invention can communicate with these cloud management platforms to provide both business and IT dimensions for scaling requirements. As mentioned above, embodiments of the present invention include performing a cognitive analysis of both structure and unstructured data, from a variety of sources. The program code can utilize an existing cognitive agent to perform this analysis, including but not limited to, IBM Watson®. IBM Watson® is a registered trademark of International Business Machines Corporation, Armonk, N.Y., US. For example, in some embodiments of the present invention, the program code interfaces with the application programming interfaces (APIs) that are part of a known cognitive agent, such as the IBM Watson® Application Program Interface (API), a product of International Business Machines Corporation, to identify relationships between resources of a technical environment and business priorities of the users of the resources of the technical environment, to generate key performance factors, which the program code associates with issues and prioritizes the issues in accordance with these associated values. In some embodiments of the present invention, in order to process structured and unstructured data that informs the key performance factors, APIs utilized by the one or more programs can include, but are not limited to, Retrieve and Rank (i.e., a service available through the IBM Watson® Developer Cloud that can surface the most relevant information from a collection of documents), concepts/visual insights, trade off analytics, document conversion, and/or relationship extraction.

FIG. 1 is a workflow 100 that illustrates various aspects of some embodiments of the present invention. As illustrated in FIG. 1, in embodiments of the present invention, program code generates correlations between events and incidents (or issues) experienced within the technical environment (e.g., computing systems) utilized by a given entity (e.g., organization, group, user, process). To generate theses correlations, the program code performs a cognitive analysis based on both structured and unstructured data from a variety of communication channels (e.g., emails, social media postages, newspapers and/or government announcements). For example, the program code generates alerts in real-time when an event occurs that the program code determines will impact the entity, based on key performance indicators (KPIs) that affect the entity. A KPI is a measurable value that demonstrates how effectively a company is achieving key business objectives. Organizations use KPIs at multiple levels to evaluate their success at reaching targets. High-level KPIs can focus on the overall performance of the enterprise, while low-level KPIs can focus on processes in departments such as sales, marketing or a call center.

Returning to FIG. 1, in an embodiment of the present invention, the program code executed by one or more processors obtains data from both structured and unstructured data sources (110). The program code cognitively analyzes the data and through this analysis, correlates potential issues experienced by components of a computing system utilized by an entity with business alerts (120). By obtaining and analyzing unstructured data, program code in embodiments of the present invention can identify unexpected business risks. For example, by analyzing data from communications, including but not limited to, email, the program code can identify changes in usage patterns due to new applications, policies or systems where business performance can be impacted by IT issues or capacity limitations. Also, from external sources of information, including but not limited to, social media, news, and government announcements, the program code can identify IT or business issues. By analyzing unstructured data from these sources, the program code can identify risks or garner additional insight regarding existing entity priorities.

As part of the cognitive analysis, the program code can prioritize certain technical assets within the computing environment as being more or less important, from a business perspective, to the entity and/or identify blind spots where impacts of various issues on the efficacy of the entity (e.g., to achieve business goals) are unknown. Thus, certain of the business alerts generated by the program code can correlate with incidents with unknown impacts, based on the blind spots identified by the program code Returning to FIG. 1, in some embodiments of the present invention, the program code ranks the correlated business alerts, based on the cognitive analysis of the data and additional priorities (e.g., service level agreements (SLAs)) (130). In some embodiments of the present invention, the program code assigns higher priority rankings to potential issues that would result in greater impacts to the entity. For example, the program code can assign a higher priority to issues that indicate a failure of a component that will instantly impact the business continuity of the entity. Based on identifying an issue with a given component of the computing system, the program code issues a business alert with an urgency commensurate with a priority of the issue (140). In some embodiments of the present invention, the notification can include a business alert message that represents a single occurrence of the identified issue (e.g., error, elapsed time, cost, etc.) in a single process. The program code can also provide a KPI value (measured across multiple process instances) in the notification to indicate that the KPI is in an undesirable state (e.g., too low, too high, in the wrong range), or trending to a problematic state, based on the issue.

Figure 2:
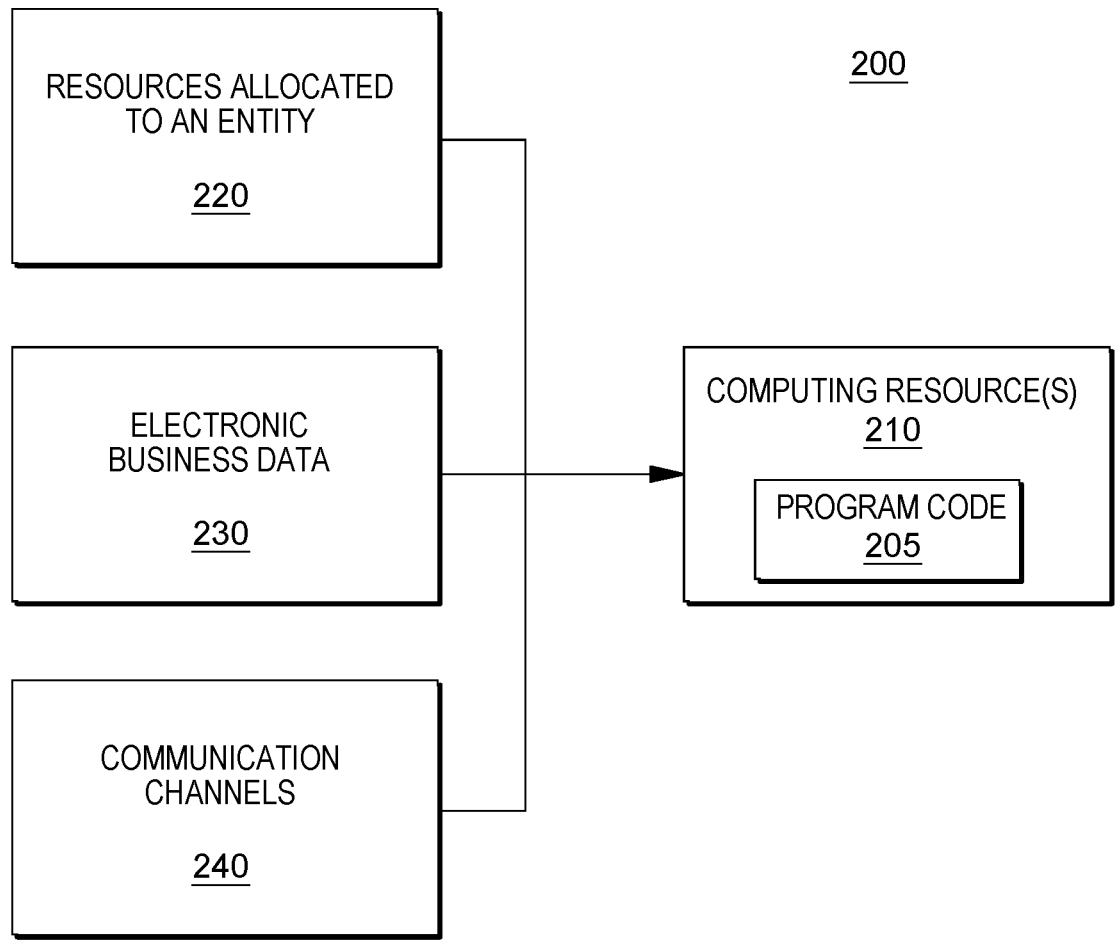
FIG. 2 is an illustration of various aspects of an environment in which aspects of embodiments of the present invention can be implemented.

FIG. 2 is a technical overview 200 of various resources that can comprise an environment into which aspects of some embodiments of the present invention can be implemented. As illustrated in this non-limiting example, program code 205 executing on at least one processing resource 210 obtains data from a variety of sources in order to determine, dynamically, priorities for various technical issues experienced by resources 220 allocated to an entity, by correlating the technical issues with business impacts of the issues. The program code 205 obtains electronic business data 230 that defines entity priorities and thresholds (e.g., KPI, threshold and business impact calculations and estimates). The program code 205 also obtains data from sources external to the resources 220 allocated to an entity, including from communication channels 240 such as news, email, social media, etc.

The program code 205 monitors the resources 220 for reports of technical issues. In some embodiments of the present invention, the program code 205 can receive data regarding technical issues experienced within the resources 220 from a monitoring system executing on a resource (not pictured) communicatively coupled to the processing resource 210 and the resources 220 allocated to the entity, including on one or more of the resources 220. For example, the program code 205 can obtain incident tickets from the monitoring system that provide the program code 205 with technical issues identified by the monitoring system and/or reported by users and/or the entity, utilizing the resources 220.

In some embodiments of the present invention, the program code 205 performs a cognitive analysis to correlate the business data with the technical issues, i.e., the program code 205 determines which issues, with which allocated resources 220, would generate the greatest negative impact on the entity (e.g., disrupting business continuity, causing the KPI to depart from an acceptable threshold, etc.). Based on this determination, the program code 205 dynamically prioritizes the technical issues.

The program code 205 continuously obtains data from the resources 220, business data 230 sources, and communication channels 240 and determines whether to adjust the prioritization of issues based on new data. For example, based on the program code 205 identifying an implementation of a new application by the entity, to execute on a resource of the resources 220, where the application was implemented as part of a new project of the entity, as indicated in the business data 230, and the reason for the project is a new compliance requirement introduced by a governing body, as indicated by data the program code 205 extracted from the news (e.g., communication channel 240), the program code 205 can prioritize issues with the resource executing the application at a higher level.

Issues obtained by the program code 205 inform the cognitive analysis performed by the program code 205 (with or without utilizing a separate cognitive agent), to increase the intelligence of the correlations through continuous machine learning, the program also determines whether an action should be taken, based on the issue and the priority of the issue. Additionally, when the program code 205 determines that an issue has occurred in the allocated resources 220, the program code 205 determines, based on the correlated prioritization, whether an action should be taken and, optionally, what action should be taken, to mitigate the issue. Based on the priority, the mitigation action and the timing of the action can differ. For example, in a distributed system with multiple resources serving multiple entities, the program code 205 can address certain issues before others, based on the priority of the issues and the resources available to address these issues.

In some embodiments of the present invention, the program code 205 addresses an issue by notifying a stakeholder, electronically, of the issue. In the notification, the program code 205 can indicate the priority of the issue. The program code can also provide data indicating the perceived impacts of the issue on the KPI should the issue persist.

In some embodiments of the present invention, in addition to or instead of notifying a stakeholder of an issue, the program code can automatically mitigate the issue. The program code can fix the issue by making changes to an allocated resource 220 and/or the program code can allocate a new resource in place of the resource experiencing the issue, in order to provide business continuity to the entity.

Figure 3:
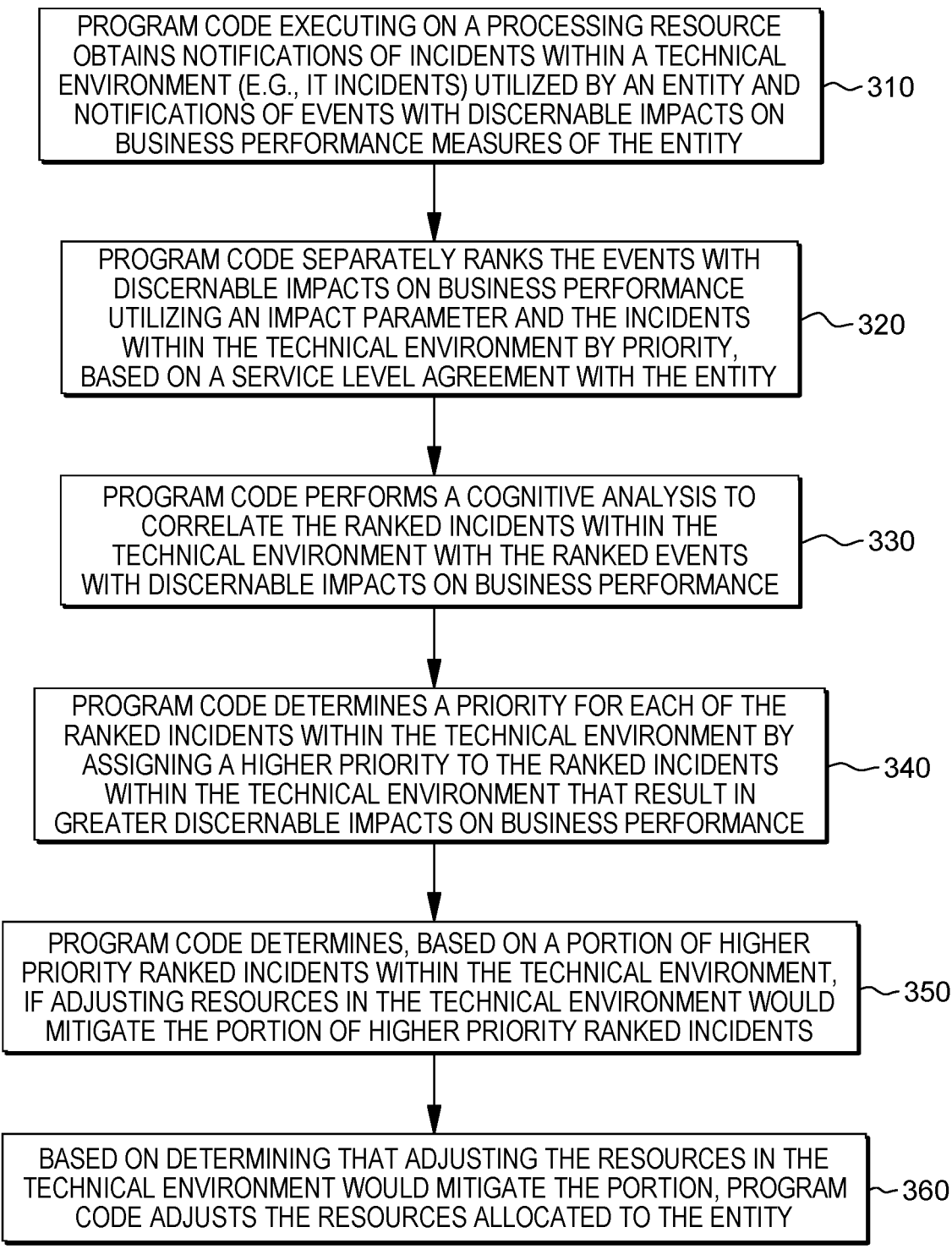
FIG. 3 is a workflow illustrating certain aspects of an embodiment of the present invention.

FIG. 3 is a workflow 300 that illustrates aspects of some embodiments of the present invention, in particular how additional factors beyond those illustrated in FIG. 2, such as service level agreements, can also impact the correlation of technical issues and business impacts of the technical issues and the assignment of priority levels to the technical issues. In some embodiments of the present invention, program code executing on at least one processing circuit of a computing resource of a distributed computing system obtains notifications of issues occurring with resources of the distributed computing system. As depicted in FIG. 3, in an embodiment of the present invention, program code executing on a processing resource obtains notifications of incidents within a technical environment (e.g., IT incidents) utilized by an entity and notifications of events with discernable impacts on business performance measures of the entity (310). In some embodiments of the present invention, the program code obtains tickets from a computing resource monitoring system as notifications of incidents. The some embodiments of the present invention, the program code obtains messages with KPI and a threshold and business impact calculation/estimate as notifications of events with discernable impacts on business performance measures. The program code separately ranks the events with discernable impacts on business performance utilizing an impact parameter and the incidents within the technical environment by priority, based on a service level agreement with the entity (320). In an embodiments of the present invention, the program code can determine the impacts of events and incidents through rating or quantifying these events and incidents, for example on a scale. The program code may also assign ratings from a predetermined scale (e.g., low, medium, high, etc.), or numerical rating system. By providing events and incidents with ratings that carry quantities, these events and incidents can be compared with each other by the program code.

Returning to FIG. 3, the program code performs a cognitive analysis to correlate the ranked incidents within the technical environment with the ranked events with discernable impacts on business performance (330). The program code determines a priority for each of the ranked incidents within the technical environment by assigning a higher priority to the ranked incidents within the technical environment that result in greater discernable impacts on business performance (340). The program code determines, based on a portion of higher priority ranked incidents within the technical environment, if adjusting resources in the technical environment would mitigate the portion of higher priority ranked incidents (350). Based on determining that adjusting the resources in the technical environment would mitigate the portion, the program code adjusts the resources allocated to the entity (360).

Figure 4:
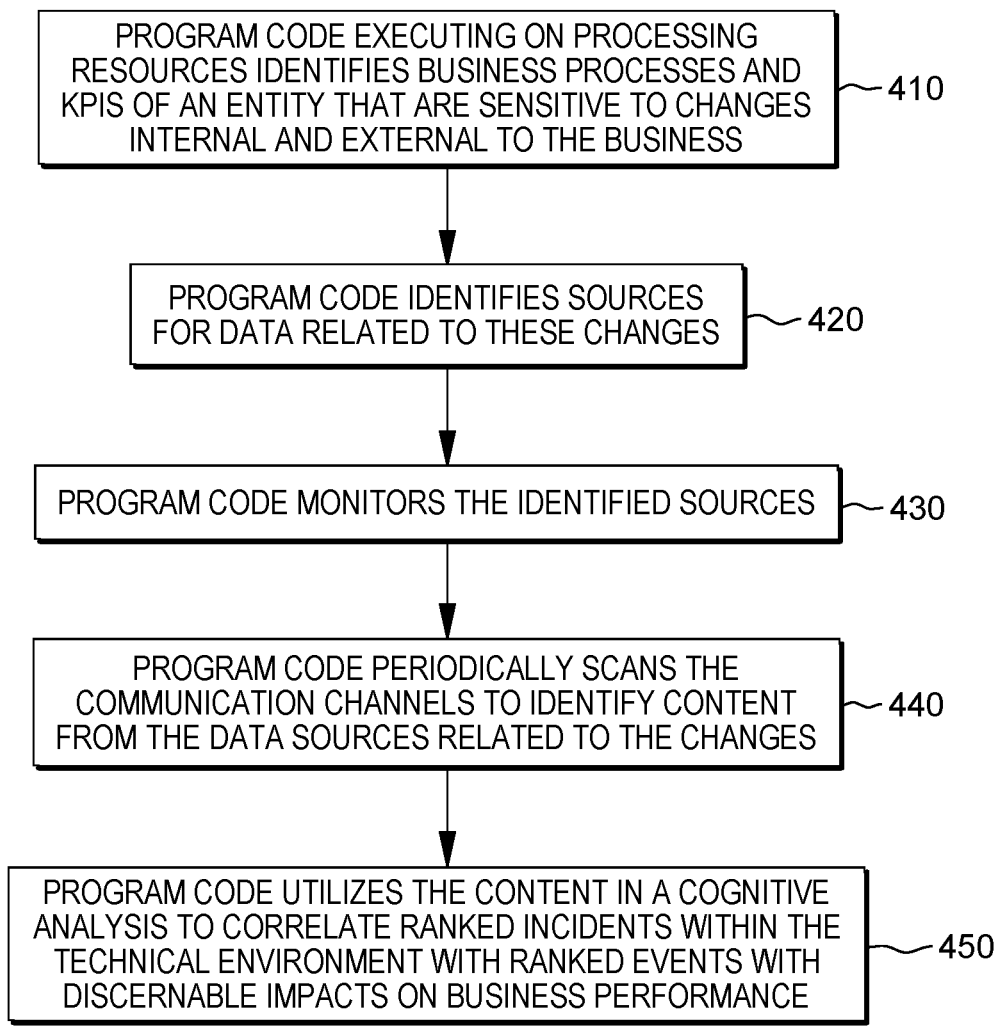
FIG. 4 is a workflow illustrating certain aspects of an embodiment of the present invention.

In some embodiments of the present invention, the program code obtains communications with business indicators from one or more outside sources and/or channels. FIG. 4 illustrates how obtaining these communications with business indicators can be utilized in embodiments of the present invention. These communication channels and/or sources can be mapped to the resource executing the program code. In some embodiments of the present invention, program code executing on processing resources identifies business processes and KPIs of an entity that are sensitive to changes internal and external to the business (410). The program code identifies sources for data (e.g., communication channels) related to these changes (420). For example, the program code can determine that a KPI of an entity is susceptible to severe weather warnings. For example, if the entity is a networked gaming arena, severe weather can signal an uptick in business, therefore requiring more computing resources to accommodate users of the networked systems. The program code monitors the identified sources (430). To monitor the sources, in some embodiments of the present invention, the program code periodically scans the communication channels to identify content from the data sources related to the changes (e.g., business risk indicators) (440). The program code utilizes the content in a cognitive analysis (e.g., FIG. 3, 330) to correlate ranked incidents within the technical environment with ranked events with discernable impacts on business performance (which now include both the business events and the identified content from the channels) (450). The program code machine learns from this enhanced cognitive analysis and can apply this additional data to enhance future cognitive analysis.

Figure 5:
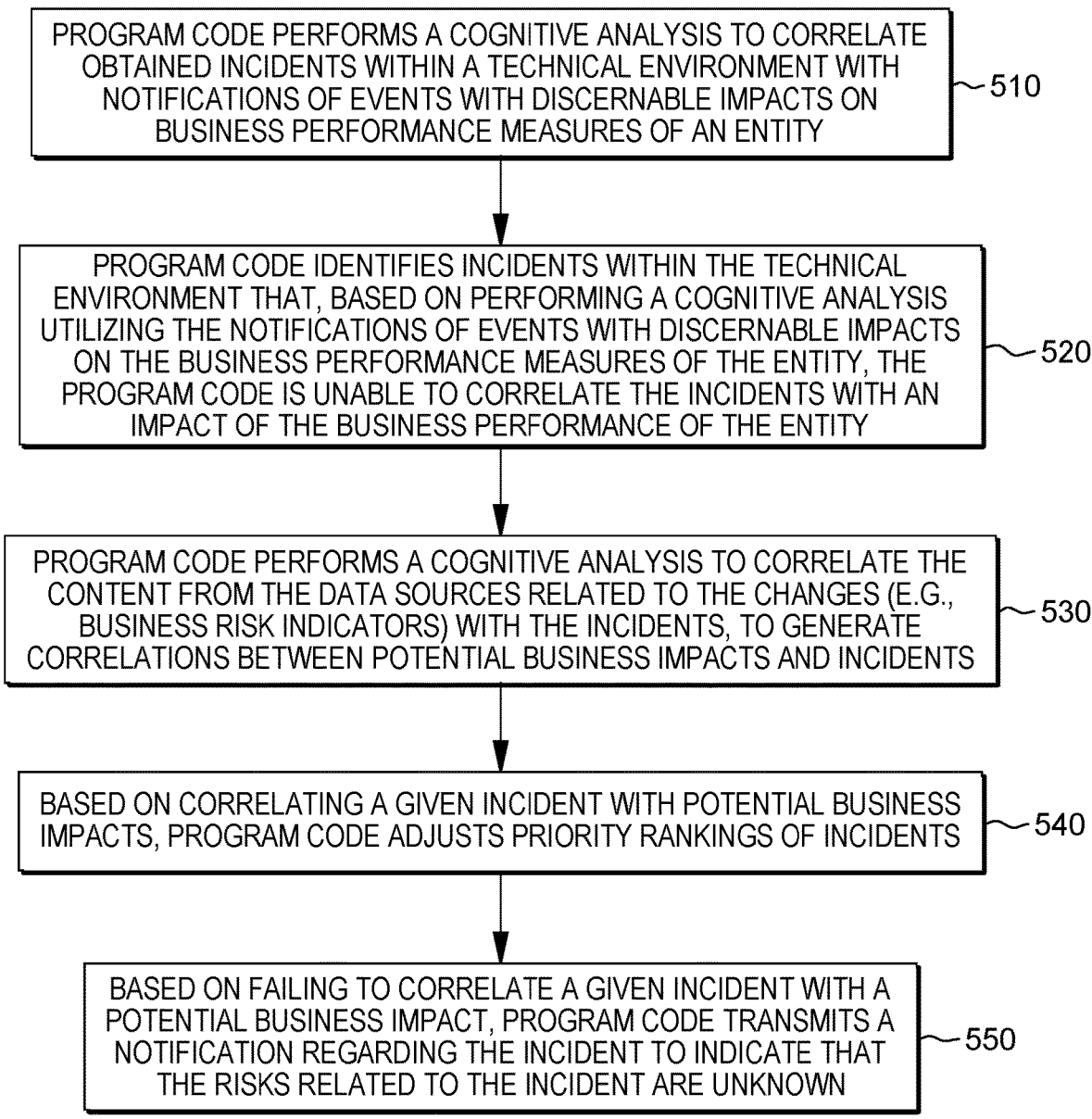
FIG. 5 is a workflow illustrating certain aspects of an embodiment of the present invention.

In addition to optionally completing the workflow 300 of FIG. 3 utilizing the prioritized incidents to mitigate issues within the technical environment, the program code can utilize the identified content from the channels to fill in perceived blind spots where the program code is unable to establish a relationship between a business event and an IT issue and therefore, cannot prioritize mitigating the IT issue based on potential business impacts. FIG. 5 illustrates aspects of a workflow 500 in an embodiment of the present invention where program code executed by a processing circuit correlates technical environment issues (e.g., IT issues) with business impacts.

In embodiments of the present invention, the program code not only is able to correlate various technical issues experience with business impacts, the program code is also able to identify where the impacts of a given technical issue are unknown (i.e., present a blind spot), so that an entity utilizing a system is alerted when an issue is experienced where the impacts are unknown and therefore is given the opportunity to mitigate this issue. As illustrated in FIG. 5, in an embodiment of the present invention, the program code performs a cognitive analysis to correlate obtained incidents within a technical environment with notifications of events with discernable impacts on business performance measures of an entity (510). The program code identifies incidents within the technical environment that, based on performing a cognitive analysis utilizing the notifications of events with discernable impacts on the business performance measures of the entity, the program code is unable to correlate the incidents with an impact of the business performance of the entity (520). The program code performs a cognitive analysis to correlate the content from the data sources related to the changes (e.g., business risk indicators) with the incidents, to generate correlations between potential business impacts and incidents (530). Based on correlating a given incident with potential business impacts, the program code adjusts priority rankings of incidents (540). Based on failing to correlate a given incident with a potential business impact, the program code transmits a notification regarding the incident to indicate that the risks related to the incident are unknown (550). Thus, rather than assign a given incident a low priority, embodiments of the present invention can alert an entity to an incident with unforeseen impacts.

Figure 6:
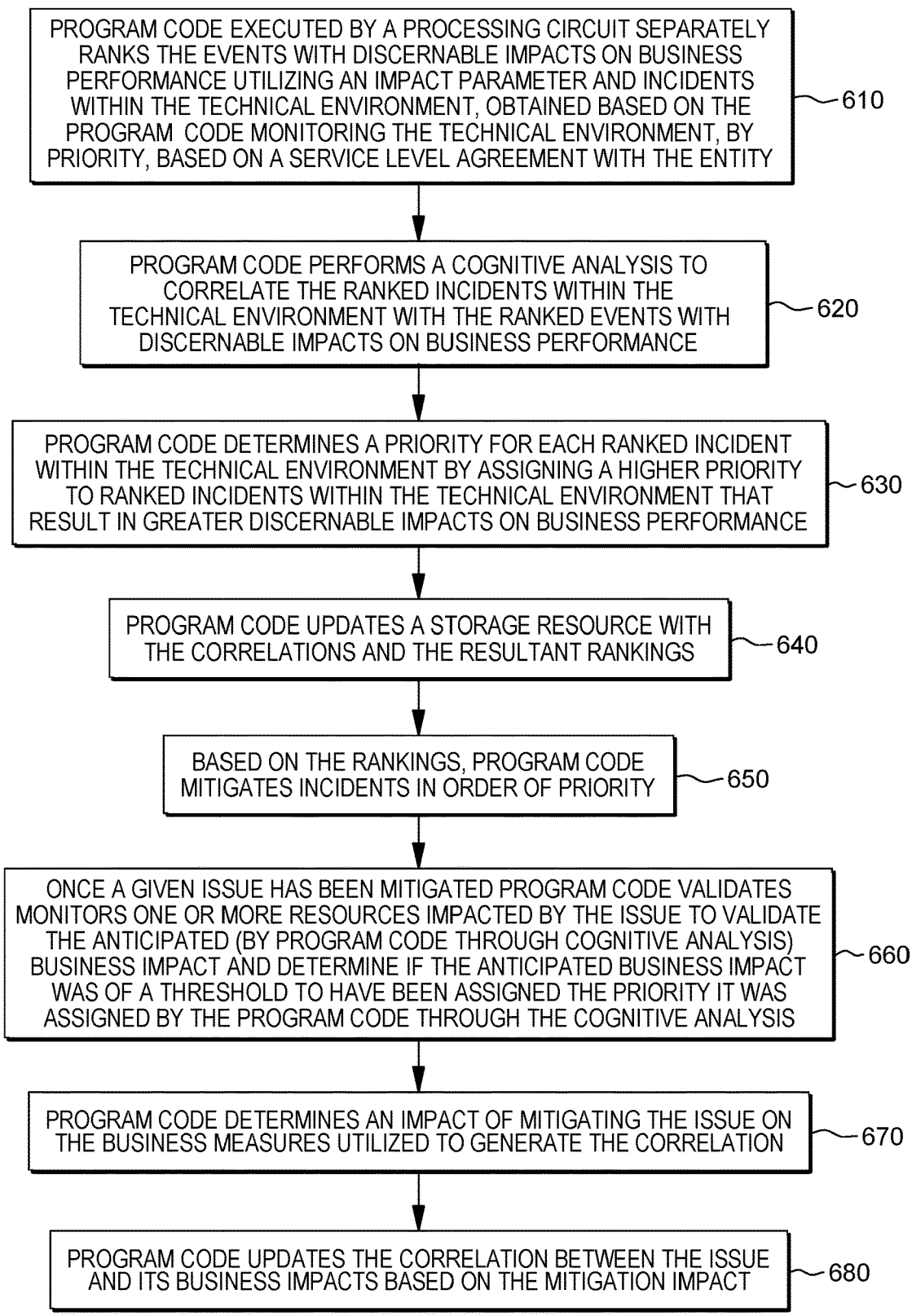
FIG. 6 is a workflow illustrating certain aspects of an embodiment of the present invention.

As aforementioned, in embodiments of the present invention, the accuracy of the program code in correlating technical issues with business impacts increases with the use of the system because the program code is machine learning. FIG. 6 is a workflow 600 that illustrates machine learning aspects of some embodiments of the present invention. These machine learning aspects assist in enabling the program code to avoid and/or minimize business impacts that are caused by technical (e.g., IT) issues in a computing environment. These aspects can work in concert with the aspects illustrated in FIGS. 3-5, which illustrated how program code in some embodiments of the present invention avoid and/or mitigate the impacts of technical issues on business continuity and other business measures of an entity by enabling the program code to resolve incidents with real or potential higher impacts, first.

Turning to FIG. 6, in an embodiment of the present invention, program code executed by a processing circuit separately ranks the events with discernable impacts on business performance utilizing an impact parameter and incidents within the technical environment, obtained based on the program code monitoring the technical environment, by priority, based on a service level agreement with the entity (610) (e.g., FIG. 3, 320). The program code performs a cognitive analysis to correlate the ranked incidents within the technical environment with the ranked events with discernable impacts on business performance (620) (e.g., FIG. 3, 330). The program code determines a priority for each ranked incident within the technical environment by assigning a higher priority to ranked incidents within the technical environment that result in greater discernable impacts on business performance (630) (e.g., FIG. 3, 340). The program code updates a storage resource with the correlations and the resultant rankings (e.g., business impacts) (640). Based on the rankings, the program code mitigates incidents in order of priority (650). In some embodiments of the present invention, the program code mitigates the incidents by transmitting electronic notifications to stakeholders in the business impacts identified and provides the stakeholders with options to send custom messages to guide the mitigation of the issue. Thus, the mitigation of an issue by the program code can include the program code soliciting and receiving feedback from users (and applying the feedback) to determine how to mitigate a given issue. For example, some issues are mitigated by shutting down and restarting resources. The program code can communicate with a stakeholder to determine an appropriate window for a restart.

In some embodiments of the present invention, once a given issue has been mitigated (e.g., the issue is closed) the program code validates monitors one or more resources impacted by the issue to validate the anticipated (by the program code through cognitive analysis) business impact and determine if the anticipated business impact was of a threshold to have been assigned the priority it was assigned by the program code through the cognitive analysis (660). The program code determines an impact of mitigating the issue on the business measures utilized to generate the correlation (670). The program code updates the correlation between the issue and its business impacts based on the mitigation impact (680). By adding the impacts of mitigating an issue into a cognitive analysis, the program code can more accurately gage the significance of an IT actions while avoiding and minimizing business impacts.

Figure 7:
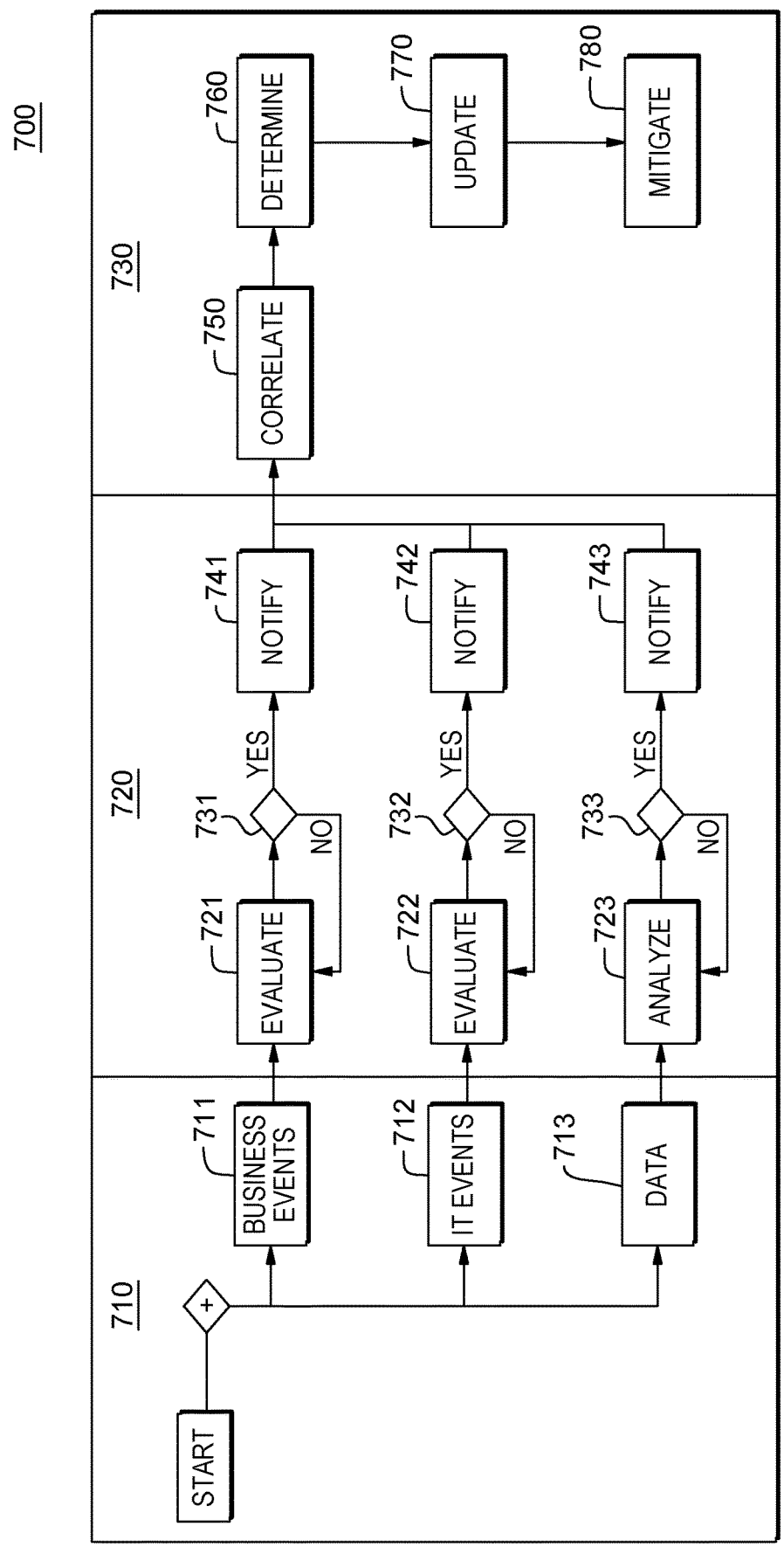
FIG. 7 is a business flow diagram illustrating certain aspects of an embodiment of the present invention.

FIG. 7 is a business flow 700 diagram that provides a concise view of various aspects of some embodiments of the present invention. As FIGS. 3-6 focus on certain aspects of some embodiments of the present invention, FIG. 7 provides an overview of a business flow when certain aspects are combined. In FIG. 7, a cognitive analysis tool, such as Watson, can be utilized to validate prioritization by the program code during an initial execution of the pictures workflow 700. FIG. 7 is divided into different parts of a business flow 600, event arrival 710, event processing 720, and responsive processing 730.

At event arrival 710, the program code obtains business events 711, IT events 712, and unstructured data from external sources 713. In event processing 720, upon obtaining the business events 711, the program code evaluates each event obtained against relevant KPIs, SLAs for business situations 721 to determine whether the event reaches a significance threshold 731. If the program code determines that the threshold 731 is reached, the program code sends a notification 741, related to the business event. Upon obtaining the IT events 712, the program code evaluates each event obtained against relevant KPIs, SLAs for IT situations 722 to determine whether the event reaches a significance threshold 732. If the program code determines that the threshold 732 is reached, the program code sends a notification 742, related to the IT event. Upon obtaining the unstructured data 713, the program code analyzes the unstructured data to determine potential impacts based on content extracted and analyzed 723. If the program code determines that the unstructured data indicates impacts 733, the program code sends a notification 743. In some embodiments of the present invention, rather than formal alert messages or notifications, the program code continues to the responsive processing 730 phase of the business flow 700, based on the program code determining that a business event, an IT event, and/or unstructured data, can be utilized in correlating business impacts to an entity with IT events experienced in resources utilized by the entity.

In a responsive processing 730 aspects of the illustrated business flow 700, the program code obtains the previously evaluated business events, IT events, and results from the analysis of the unstructured data and utilizes this data to correlate events and derive an initial priority for mitigating each IT event 740. The program code determines a financial impact of each IT event 750. The program code determine the general business impact of each IT event 760. The program code updates the initial priority of each IT event 770. The program code mitigates the IT events, in accordance with the priorities 780. In some embodiments of the present invention, the program code notifies stakeholders of the high priority events. In some embodiments of the present invention, the program code utilizes Watson or another cognitive analysis tool to validate the assigned priorities of the events. In some embodiments of the present invention, the program code mitigates an event by updating a ticket in a monitoring tool to reflect the generated priority.

Figure 8:
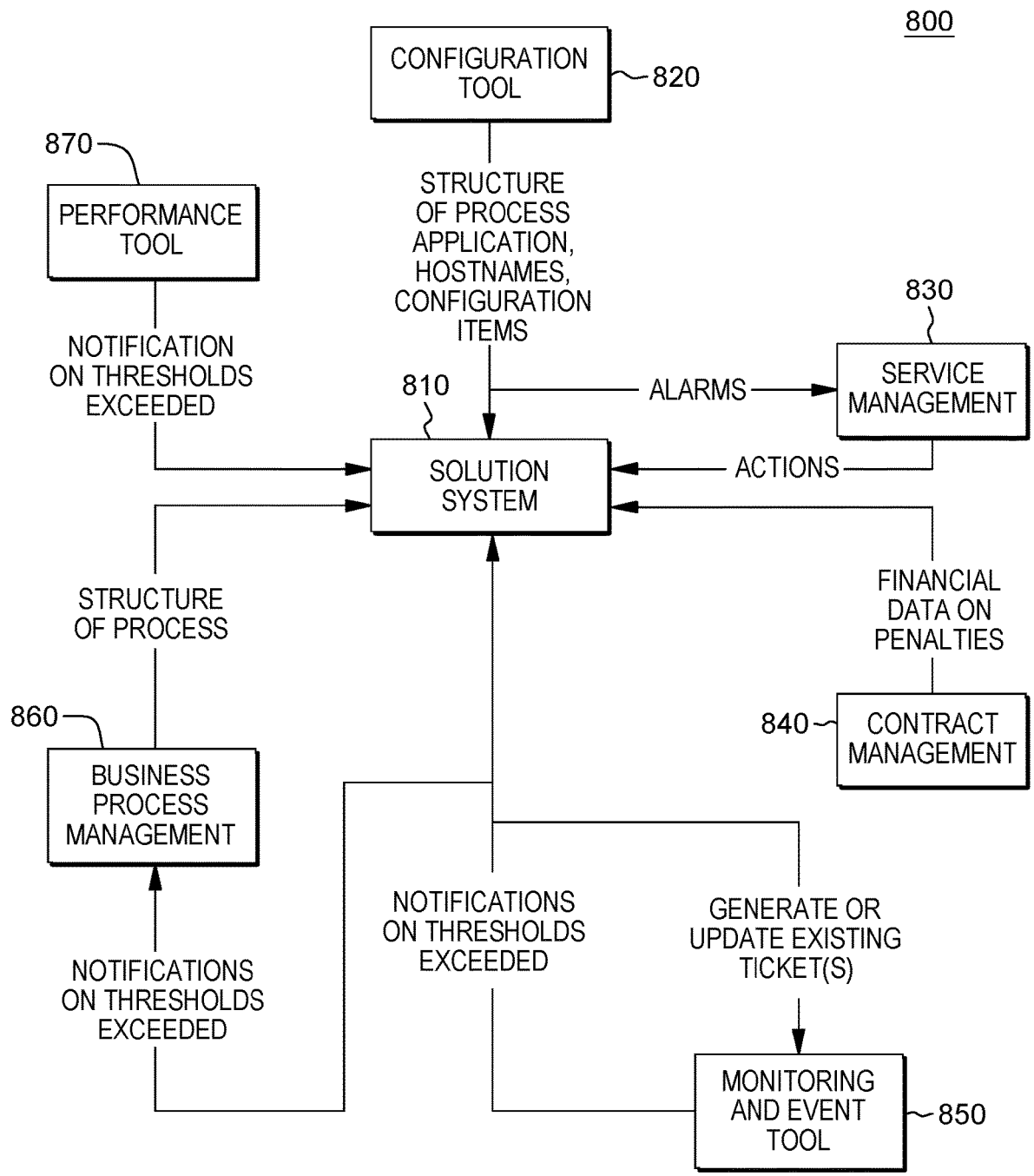
FIG. 8 is a context diagram illustrating various aspects of an embodiment of the present invention.

FIG. 8 is a system context diagram 800 that illustrates the interplay of various systems in a computing environment that contribute to the efficacy of embodiments of the present invention. In this diagram 800, an embodiments of the present invention is depicted as a solution system 810, which obtains data from various systems and updates the data in these systems in order to anticipate and mitigate IT issues with potentially problematic business impacts in a technical environment. Among the systems that the solution system 810 interacts with are: 1) a configuration tool 820, from which the solution system 810 obtains data regarding the structure of applications (e.g., configuration items); 2) a service management system 830, from which the solution system 810 obtains actions and to which the solution system 810 provides notifications; 3) a contract management system 840, from which the solution system 810 obtains financial data related to penalties if services under contracts are not available to an entity utilizing allocated resources; 4) a monitoring and event tool 850, from which the solution system 810 obtains notifications if events exceed configured thresholds (from the configuration tool 820) are exceeded, and to which the solution system 810 transmits or updates incident tickets to trigger mitigation of the events; 5) a business process management tool 860, from which the solution system 810 obtains structures of processes and notifications if these threshold are exceeded; and 6) a performance tool 870, from which the solution system 810 obtains notifications if configured threshold are exceeded.

Embodiments of the present invention include a computer-implemented method, a computer program product, and a computing system, that includes program code executed on one or more processors to perform a method including obtaining notifications of issues experienced in computing resources allocated to an entity from a shared distributed computing environment. The program code obtains notifications of events with discernable impacts on business performance measures of the entity. The program code quantifies a technical performance impact of each issue of the issues on the technical performance of the allocated computing resources. The program code quantifies, based on one or more performance measures, a business performance impact of each event of the events on the business performance measures of the entity. The program code cognitively analyzes the business performance impact of each event and the technical performance impact of each issue to correlate a portion of the quantified events with a portion of the quantified issues. The program code prioritizes, based on the cognitive analysis, the portion of the issues by severity of business performance impact, wherein an issue of the portion with a greater discernable impact on business performance is assigned a higher priority. The program code mitigates the portion of the issues experienced in the computing resources allocated to the entity, in order of priority.

In some embodiments of the present invention, when the program code mitigating includes: the program code determining that adjusting allocations of resources in the shared distributed computing system will mitigate one or more of the portion of the issues with a higher priority, of the portion of the issues, and the program code adding additional computing resources from the shared distributed computing system to the computing resources allocated to the entity.

In some embodiments of the present invention, the program code mitigates by determining that adjusting allocations of resources in the shared distributed computing system will mitigate one or more of the portion of the issues with a higher priority, of the portion of the issues, and re-configuring the computing resources allocated to the entity.

In some embodiments of the present invention, the discernable impacts are based on pre-defined performance measures.

In some embodiments of the present invention, the program code cognitively analyzes the business performance impact of each event and the technical performance impact of each issue further by: identifying sources of unstructured data comprising temporal data relevant to the entity, intermittently obtaining unstructured data from the sources, analyzing the unstructured data to identify content potentially related to the events with the discernable impacts, and utilizing the identified content, in the cognitive analysis, to correlate the portion of the quantified events with the portion of the quantified issues.

In some embodiments of the present invention, the program code cognitively analyzing further includes: the program code cognitively analyzing the business performance impact of each event and the technical performance impact of each issue to identify a second portion of the quantified issues with no correlation to the quantified events, based on the cognitive analysis, and the program code generating a notification, based on an occurrence of a quantified issue of the second portion of the quantified issues.

In some embodiments of the present invention, the program code obtains, via a resource of the allocated resources, data correlating one or more issues of the second portion of the quantified issues with a second portion of the quantified events, The program code prioritizes, based on the data, the one or more issues by severity of business performance impact.

In some embodiments of the present invention, the program code updates a memory resource with the correlations generated by the cognitive analysis and the prioritization of the portion of the issues. The program code monitors the mitigating of the portion of the issues to validate accuracy of the prioritization of the portion of the issues. The program code updates the memory resource based on the validation.

In some embodiments of the present invention, the program code cognitively analyzing includes: the program code transmitting the data related to the issues and the events to a cognitive analysis tool, and the program code obtaining results from the cognitive analysis tool.

In some embodiments of the present invention, the program code cognitively analyzing the business performance impact of each event and the technical performance impact of each issue further comprises the program code utilizing the memory resource.

In some embodiments of the present invention, the program code cognitively analyzing the business performance impact of each event and the technical performance impact of each issue further comprises: the program code obtaining one or more service level agreements governing the allocated resources, and the program code utilizing the one or more service level agreements in the prioritizing.

In some embodiments of the present invention, the business performance measures include key performance indicators.

Referring now to FIG. 9, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the processing resource 210 (FIG. 2) and computing resources comprising the sources external to the resources 220 (FIG. 2) computing resources can each be understood as a cloud computing node 10 (FIG. 9) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 9, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. As understood by one of skill in the art, another area in which aspects of the present invention can be utilized is quantum computing. For example, aspects of embodiments of the present invention can be utilized in conjunction with solving the so-called "dinner party problem" (i.e., "How many people must you have at dinner to ensure that there are a subset of 3 people who all either mutual acquaintances, or mutual strangers?"). Because aspects of the present invention generate correlations between IT issues and business events, utilizing sources both internal and external to a given computing system, program code in embodiments of the present invention is applicable to correlation building to solve other problems. As embodiments of the present invention can be used as an alternative/improved solution to the correlation between business and IT environments for large IT environments with complex businesses processes, applying this functionality to the "dinner party problem" and other situations where correlation building is desired would be advantageous.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
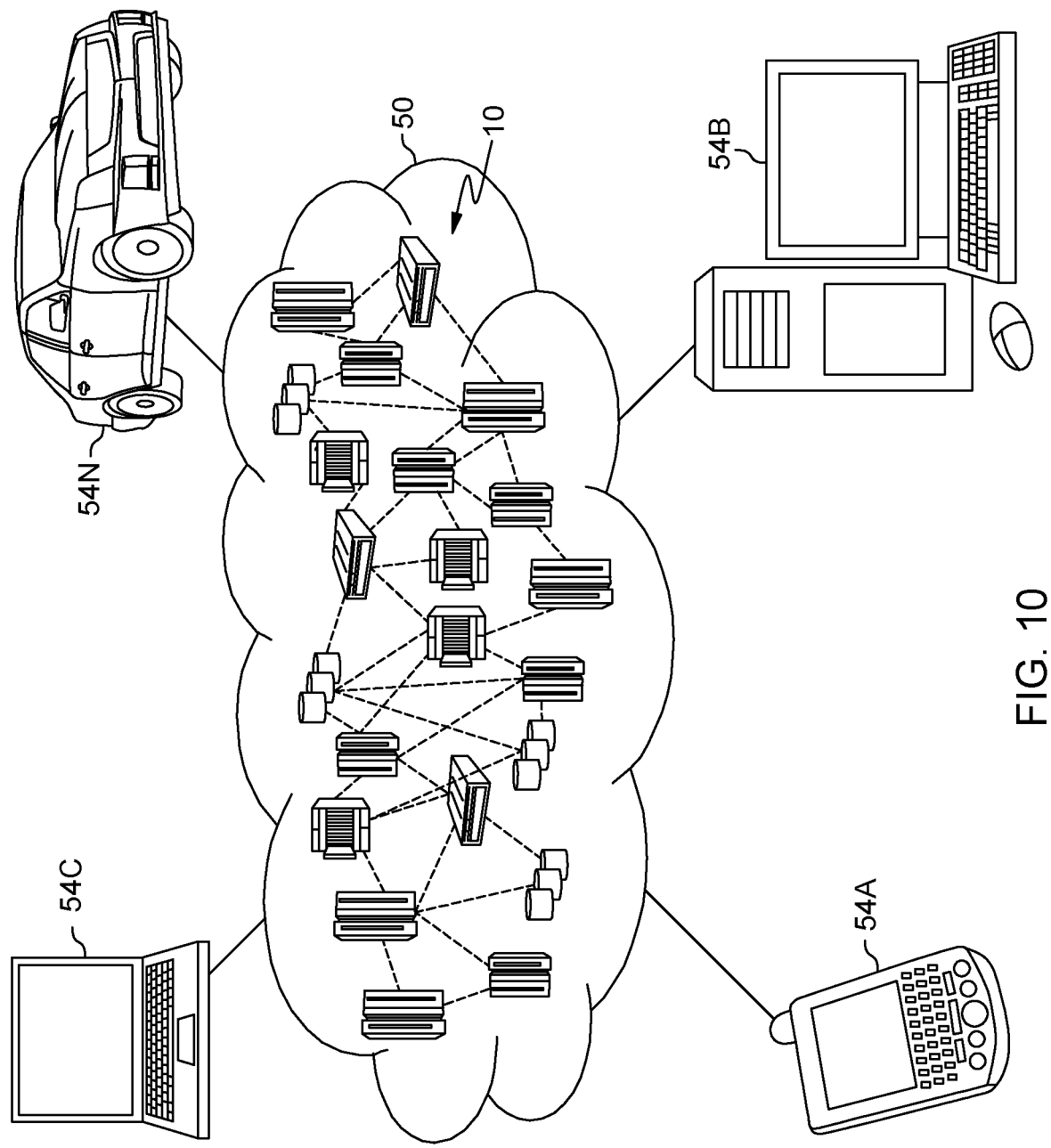
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
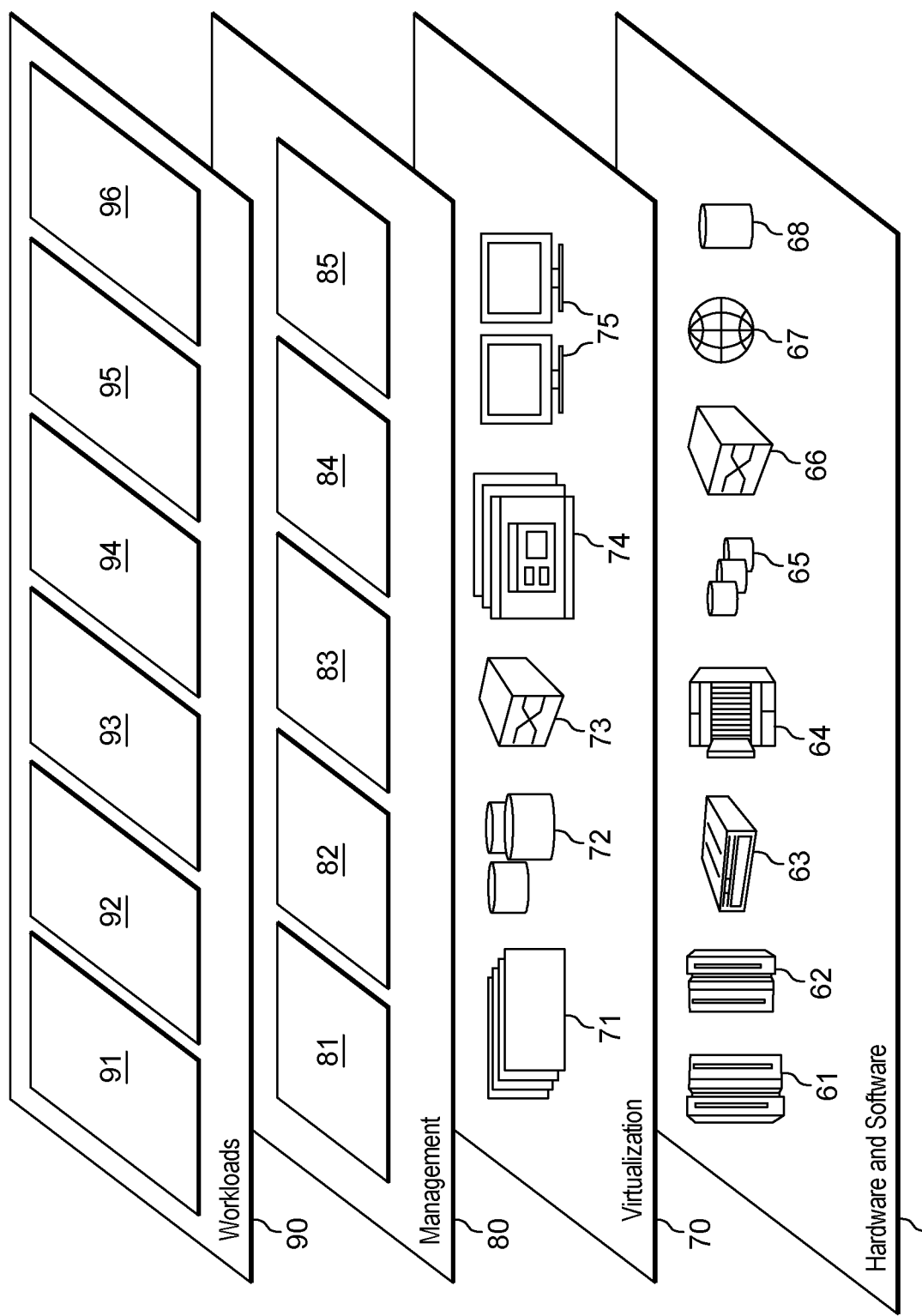
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prioritizing mitigation of issues, based on correlating business and technical impacts 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:

obtaining, by one or more processors, notifications of issues experienced in computing resources allocated to an entity from a shared distributed computing environment;

obtaining, by the one or more processors, notifications of events with discernable impacts on business performance measures of the entity;

quantifying, by the one or more processors, a technical performance impact of each issue of the issues on the technical performance of the allocated computing resources;

quantifying, by the one or more processors, based on one or more performance measures, a business performance impact of each event of the events on the business performance measures of the entity;

cognitively analyzing, by the one or more processors, the business performance impact of each event and the technical performance impact of each issue to correlate a portion of the quantified events with a portion of the quantified issues;

prioritizing, by the one or more processors, based on the cognitive analysis, the portion of the issues by severity of business performance impact, wherein an issue of the portion with a greater discernable impact on business performance is assigned a higher priority; and mitigating, by the one or more processors, the portion of the issues experienced in the computing resources allocated to the entity, in order of priority, wherein the mitigating comprises:
 determining, by the one or more processors, that adjusting allocations of resources in the shared distributed computing system will mitigate one or more of the portion of the issues with a higher priority, of the portion of the issues;
 adding, by the one or more processors, additional computing resources from the shared distributed computing system to the computing resources allocated to the entity; and
 notifying, by the one or more processors, at least one stakeholder of the mitigating of at least one issue of the portion of the issues with the higher priority, wherein the mitigating enables compliance of the allocated computing resources of the entity from a shared distributed computing environment with at least one service level agreement governing technical performance of the allocated computing resources.

2. The computer-implemented method of claim 1, wherein the mitigating further comprises:
 re-configuring, by the one or more processors, the computing resources allocated to the entity.

3. The computer-implemented method of claim 1, wherein the discernable impacts are based on pre-defined performance measures.

4. The computer-implemented method of claim 1, wherein the cognitively analyzing the business performance impact of each event and the technical performance impact of each issue further comprises:
 identifying, by the one or more processors, sources of unstructured data comprising temporal data relevant to the entity;
 intermittently obtaining, by the one or more processors, unstructured data from the sources;
 analyzing, by the one or more processors, the unstructured data to identify content potentially related to the events with the discernable impacts; and
 utilizing, by the one or more processors, the identified content, in the cognitive analysis, to correlate the portion of the quantified events with the portion of the quantified issues.

5. The computer-implemented method of claim 1, the cognitively analyzing further comprising:
 cognitively analyzing, by the one or more processors, the business performance impact of each event and the technical performance impact of each issue to identify a second portion of the quantified issues with no correlation to the quantified events, based on the cognitive analysis; and
 generating, by the one or more processors, a notification, based on an occurrence of a quantified issue of the second portion of the quantified issues.

6. The computer-implemented method of claim 5, further comprising:
 obtaining, by the one or more processors, via a resource of the allocated resources, data correlating one or more issues of the second portion of the quantified issues with a second portion of the quantified events; and
 prioritizing, by the one or more processors, based on the data, the one or more issues by severity of business performance impact.

7. The computer-implemented method of claim 1, further comprising:
 updating, by the one or more processors, a memory resource with the correlations generated by the cognitive analysis and the prioritization of the portion of the issues;
 monitoring, by the one or more processors, the mitigating of the portion of the issues to validate accuracy of the prioritization of the portion of the issues; and
 updating, by the one or more processors, the memory resource based on the validation.

8. The computer-implemented method of claim 7, wherein the cognitively analyzing comprises:
 transmitting, by the one or more processors, the data related to the issues and the events to a cognitive analysis tool; and
 obtaining, by the one or more processors, results from the cognitive analysis tool.

9. The computer-implemented method of claim 8, wherein the cognitively analyzing the business performance impact of each event and the technical performance impact of each issue further comprises utilizing the memory resource.

10. The computer-implemented method of claim 9, wherein the cognitively analyzing the business performance impact of each event and the technical performance impact of each issue further comprises:
 obtaining, by the one or more processors, one or more service level agreements governing the allocated resources, wherein the one or more service level agreements comprise the at least one service level agreement; and
 utilizing, by the one or more processors, the one or more service level agreements in the prioritizing.

11. The computer-implemented method of claim 1, wherein the business performance measures comprise key performance indicators.

12. A computer program product comprising:
 a computer readable storage medium readable by one or more processors and storing instructions for execution by the one or more processors for performing a method comprising:
  obtaining, by the one or more processors, notifications of issues experienced in computing resources allocated to an entity from a shared distributed computing environment;
  obtaining, by the one or more processors, notifications of events with discernable impacts on business performance measures of the entity;
  quantifying, by the one or more processors, a technical performance impact of each issue of the issues on the technical performance of the allocated computing resources;
  quantifying, by the one or more processors, based on one or more performance measures, a business performance impact of each event of the events on the business performance measures of the entity;
  cognitively analyzing, by the one or more processors, the business performance impact of each event and the technical performance impact of each issue to correlate a portion of the quantified events with a portion of the quantified issues;
  prioritizing, by the one or more processors, based on the cognitive analysis, the portion of the issues by severity of business performance impact, wherein an issue of the portion with a greater discernable impact on business performance is assigned a higher priority; and mitigating, by the one or more processors, the portion of the issues experienced in the computing resources allocated to the entity, in order of priority, wherein the mitigating comprises:

determining, by the one or more processors, that adjusting allocations of resources in the shared distributed computing system will mitigate one or more of the portion of the issues with a higher priority, of the portion of the issues;

adding, by the one or more processors, additional computing resources from the shared distributed computing system to the computing resources allocated to the entity; and notifying, by the one or more processors, at least one stakeholder of the mitigating of at least one issue of the portion of the issues with the higher priority, wherein the mitigating enables compliance of the allocated computing resources of the entity from a shared distributed computing environment with at least one service level agreement governing technical performance of the allocated computing resources.

13. The computer program product of claim 12, wherein the mitigating further comprises:
re-configuring, by the one or more processors, the computing resources allocated to the entity.

14. The computer program product of claim 12, wherein the discernable impacts are based on pre-defined performance measures.

15. The computer program product of claim 12, wherein the cognitively analyzing the business performance impact of each event and the technical performance impact of each issue further comprises:
identifying, by the one or more processors, sources of unstructured data comprising temporal data relevant to the entity;
intermittently obtaining, by the one or more processors, unstructured data from the sources;
analyzing, by the one or more processors, the unstructured data to identify content potentially related to the events with the discernable impacts; and
utilizing, by the one or more processors, the identified content, in the cognitive analysis, to correlate the portion of the quantified events with the portion of the quantified issues.

16. The computer program product of claim 15, the method further comprising:
obtaining, by the one or more processors, via a resource of the allocated resources, data correlating one or more issues of the second portion of the quantified issues with a second portion of the quantified events; and
prioritizing, by the one or more processors, based on the data, the one or more issues by severity of business performance impact.

17. The computer program product of claim 12, the cognitively analyzing further comprising:
cognitively analyzing, by the one or more processors, the business performance impact of each event and the technical performance impact of each issue to identify a second portion of the quantified issues with no correlation to the quantified events, based on the cognitive analysis; and
generating, by the one or more processors, a notification, based on an occurrence of a quantified issue of the second portion of the quantified issues.

18. A system comprising:
a memory;
one or more processors in communication with the memory;
program instructions executable by the one or more processors via the memory to perform a method, the method comprising:
obtaining, by the one or more processors, notifications of issues experienced in computing resources allocated to an entity from a shared distributed computing environment;
obtaining, by the one or more processors, notifications of events with discernable impacts on business performance measures of the entity;
quantifying, by the one or more processors, a technical performance impact of each issue of the issues on the technical performance of the allocated computing resources;
quantifying, by the one or more processors, based on one or more performance measures, a business performance impact of each event of the events on the business performance measures of the entity;
cognitively analyzing, by the one or more processors, the business performance impact of each event and the technical performance impact of each issue to correlate a portion of the quantified events with a portion of the quantified issues;
prioritizing, by the one or more processors, based on the cognitive analysis, the portion of the issues by severity of business performance impact, wherein an issue of the portion with a greater discernable impact on business performance is assigned a higher priority; and
mitigating, by the one or more processors, the portion of the issues experienced in the computing resources allocated to the entity, in order of priority, wherein the mitigating comprises:
determining, by the one or more processors, that adjusting allocations of resources in the shared distributed computing system will mitigate one or more of the portion of the issues with a higher priority, of the portion of the issues;
adding, by the one or more processors, additional computing resources from the shared distributed computing system to the computing resources allocated to the entity; and
notifying, by the one or more processors, at least one stakeholder of the mitigating of at least one issue of the portion of the issues with the higher priority, wherein the mitigating enables compliance of the allocated computing resources of the entity from a shared distributed computing environment with at least one service level agreement governing technical performance of the allocated computing resources.

* * * * *